United States Patent [19]

Lohse et al.

[11] 4,368,317
[45] Jan. 11, 1983

[54] MIXTURES FOR THE PREPARATION OF NITROGEN-CONTAINING POLYADDUCTS

[75] Inventors: Friedrich Lohse, Oberwil; Dieter Trachsler, Kaiseraugst, both of Switzerland

[73] Assignee: Ciba-Geigy Corporation, Ardsley, N.Y.

[21] Appl. No.: 262,571

[22] Filed: May 11, 1981

[30] Foreign Application Priority Data

May 23, 1980 [CH] Switzerland .......................... 4055/80

[51] Int. Cl.³ .............................................. C08G 69/14
[52] U.S. Cl. ..................................... 528/323; 428/411; 428/480; 521/189; 528/112; 528/113; 528/114; 528/116; 528/117; 528/118; 528/211; 528/288; 528/289
[58] Field of Search ............... 528/323, 326, 211, 112, 528/113, 114, 116, 117, 118, 288, 289

[56] References Cited

U.S. PATENT DOCUMENTS

| | | | |
|---|---|---|---|
| 3,291,673 | 12/1966 | Sugino et al. | 528/367 |
| 3,308,101 | 3/1967 | Ikeda | 528/367 |
| 3,642,725 | 2/1972 | Schminke et al. | 528/367 |
| 3,779,997 | 12/1973 | Langager | 528/367 |
| 4,031,067 | 6/1977 | Sundermann et al. | 528/391 |
| 4,066,577 | 1/1978 | Sundermann et al. | 528/367 |

OTHER PUBLICATIONS

CA, 68, 78749z (1968).
CA, 73, 99400x (1970).
CA, 60, 15835d (1964).

Primary Examiner—Harold D. Anderson
Attorney, Agent, or Firm—Luther A. R. Hall

[57] ABSTRACT

A mixture for the preparation of novel cross-linked nitrogen-containing polyadducts, which contains (a) a N-cyanolactam of the formula I or II

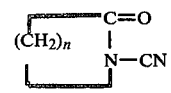

(I)

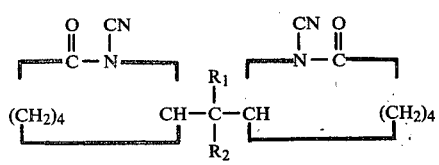

(II)

and (b) a monomeric or oligomeric organic compound having not less than 2 C atoms and not less than 2 hydroxyl groups.

The mixture, with or without addition of a monohydroxy compound, can be used as a casting resin or adhesive, or for the production of foams or coatings.

The symbols in the formula are all as defined in claim 1.

9 Claims, No Drawings

MIXTURES FOR THE PREPARATION OF NITROGEN-CONTAINING POLYADDUCTS

The invention relates to a mixture for the preparation of novel crosslinked nitrogen-containing polyadducts, which mixture contains an organic compound having not less than 2 C atoms and not less than 2 hydroxyl groups, and a N-cyanolactam.

German Offenlegungsschrift 2,533,119 discloses that high-molecular polytriazines can be prepared by reacting difunctional and polyfunctional aromatic cyanamides with difunctional and polyfunctional aromatic cyanates at an elevated temperature. Analogously, substituted polytriazines are obtained by reacting aromatic cyanates with aromatic N-cyanosulfonamides, as described in German Offenlegungsschrift 2,533,126, or by polyaddition of N-cyanamidoaryl cyanates.

Further, U.S. Pat. No. 3,291,673 describes the homopolymerisation and copolymerisation of alkylenedicyanamides. Hard, colourless and transparent polymers, whose structure is not described in more detail in the patent, are obtained.

U.S. Pat. No. 3,308,101 discloses that the reaction of monocyanamides with biscyanamides gives crosslinked polymers having recurring melamine structural units.

Further, U.S. Pat. No. 3,779,997 describes the preparation of substituted polyamines by polyaddition, brought about by heat treatment, of bis-cyanamides of secondary alkylenediamines.

The polymerisation of polyfunctional cyanamides of secondary amines in the presence of from catalytic amounts to more than molar amounts of monohydric or polyhydric hydroxy compounds, at temperatures of 50°–250° C., to give polymeric products, is also known, namely from German Offenlegungsschrift 1,595,651.

Further, it is known that N-cyanolactams are efficient polymerisation catalysts, for example for the anionic polymerisation of α-pyrrolidone (German Auslegeschrift 1,261,671) or for the preparation of polyamides (German Offenlegungsschrift 1,905,098).

It has now been found that N-cyanolactams may be used as polymerisation components, capable of undergoing addition reaction, for the preparation of crosslinked polyadducts.

Accordingly, the present invention provides a mixture of crosslinked nitrogen-containing polyadducts which contains
(a) a N-cyanolactam of the formula I or II

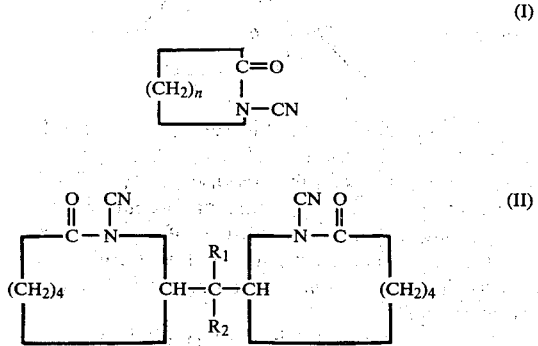

in which n is an integer from 2 to 11, the methylene carbon atoms are unsubstituted or substituted, in total, by one or two methyl or ethyl groups; and R₁ and R₂, independently of one another, are hydrogen or methyl, and
(b) a monomeric or oligomeric organic compound having not less than 2 C atoms and not less than 2 hydroxyl groups.

In a preferred embodiment of the invention, the mixture contains component (b) in an amount corresponding to 0.2–3.0 hydroxyl equivalents of component (b) per mol of (a).

Examples of suitable compounds of the formula I are N-cyanopyrrolidone, N-cyanopiperidone, N-cyanocaprolactam, N-cyanocapryllactam, N-cyanoenantholactam, N-cyanocaprilactam, N-cyanolauryllactam, N-cyano-ε-methylcaprolactam and N-cyano-ε-ethylcaprolactam.

Preferably, n is an integer from 3 to 5.

R₁ and R₂ in compounds of the formula II are preferably hydrogen.

The component (b) can be a monomeric organic compound such as:

A. A diol of the formula $$HO—Q—OH \quad\quad\quad (IV)$$

in which Q is a straight-chain or branched, saturated or unsaturated divalent aliphatic radical having 2–12 C atoms, which can be interrupted by O-bridges, or is a saturated or unsaturated divalent cycloaliphatic radical having 5–6 C atoms, or is the group

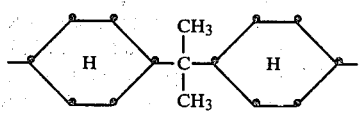

or is a derivative, substituted by halogen, C₁–C₄-alkoxy, phenoxy or C₁–C₄-alkylphenoxy, of one of the above radicals, or is the group

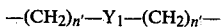

in which n′ is a number from 1 to 4 and Y₁ is C₅–C₆-cycloalkylene, phenylene, the group

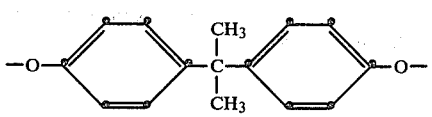

or a divalent N-heterocyclic structure, which can be a fused structure.

Examples of compounds of the formula IV are ethylene glycol, propane-1,2-diol, propane-1,3-diol, butane-1,3-diol, butane-1,4-diol, hexane-1,6-diol, dodecane-1,12-diol, neopentyl glycol, 2-ethyl-hexane-1,3-diol, xylylene glycol, the bis-(hydroxyethyl ether) of bisphenol A, unsaturated compounds, such as butene-1,4-diol and butyne-1,4-diol, cycloaliphatic compounds, such as cyclohexane-1,2-diol, cyclohexane-1,3-diol, cyclohexane-1,4-diol, hydrogenated bisphenol A and 1,4-bis-(hydroxymethyl)cyclohexane, and diethylene glycol, dipropylene glycol, the 2,3-dihydroxypropyl ether of p-methylphenol, 1,3-bishydroxyethylhydantoin, N,N′-bis-hydroxyethyl-benzimidazole and N,N′-bis-hydroxyethyl-perimidone.

Preferred compounds of the formula IV are those in which Q is a methylene chain having 2 to 6 C atoms or is the group —(CH$_2$)$_{n'}$—Y$_1$—(CH$_2$)$_{n'}$—, in which n' and Y$_1$ are as defined above.

B. A hydroxy-ester of the formula V

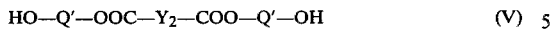

HO—Q'—OOC—Y$_2$—COO—Q'—OH   (V)

in which Y$_2$ is a direct bond, a straight-chain or branched alkylene radical having 2-12 C atoms, an unsubstituted or C$_1$-C$_4$-alkyl-substituted saturated or unsaturated C$_5$-C$_6$-cycloalkylene radical or an unsubstituted or C$_1$-C$_4$-alkyl-substituted phenylene radical, and Q' is as defined for Q or is

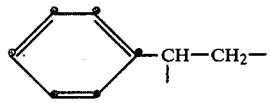

in which the —CH group is bonded to the —OH group.

Examples of compounds of the formula V are bis(hydroxyethyl) terephthalate and the adducts of ethylene oxide, propylene oxide or styrene oxide with dicarboxylic acids, such as oxalic acid, succinic acid, glutaric acid, adipic acid, sebacic acid, dodecanedicarboxylic acid, phthalic acid and isophthalic acid.

Preferred divalent hydroxy-esters are compounds of the formula V, in which Y$_2$ is a C$_2$-C$_8$-methylene chain, cyclohexylene, cyclohexenylene or phenylene and Q' is ethylene.

C. A trihydroxy or tetrahydroxy compound, which can be a straight-chain or branched saturated aliphatic compound, for example 1,1,1-trimethylolethane, 1,2,3-trihydroxypropane, 1,1,1-trimethylolpropane, hexane-1,2,6-triol or pentaerythritol, or can be a N-heterocyclic trihydroxy compound, for example 1,3,5-tri-hydroxyethyl cyanurate.

C$_3$-C$_6$ aliphatic trihydroxy compounds, especially 1,2,3-trihydroxypropane, 1,1,1-trimethylolethane and 1,1,1-trimethylolpropane are preferred.

D. An adduct, which results from the addition reaction of 1 to 2 mols of an epoxide compound, for example ethylene oxide, propylene oxide or styrene oxide, with a dihydric or polyhydric hydroxy compound as defined under A and C.

Component (b) can also be an oligomeric organic compound, for example

E. A polyol of the formula VI the formula HOOC—Y$_2$—COOH or a lactone of the formula

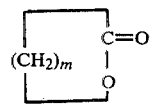

in which Y$_2$ is as defined under B and m is a number from 2 to 11.

In synthesising the hydroxy-oligoester it is also possible to add trihydroxy and tetrahydroxy compounds, as described under C, in such amounts that 1 mol of trihydroxy compound or tetrahydroxy compound is built into the molecule per mol of hydroxy-oligoester, so that a branched hydroxy-oligoester having 3 or 4 hydroxyl end groups is formed.

The oligoesters preferably have an average molecular weight of 200-4,000, especially 200-2,000.

Mixtures of the above compounds can also be employed as component (b), for example mixtures of diols of group A with oligoesters, containing hydroxyl end groups, of group G or with trihydroxy compounds of group C.

The preferred component (b) is a glycol of group A.

Furthermore, in the mixture according to the invention, up to 30 mol % of the hydroxyl equivalents of component (b) can be replaced by (c) a monohydroxy compound of the formula III

R$_3$—OH   (III)

in which R$_3$ is straight-chain or branched C$_1$-C$_{12}$-alkyl or C$_3$-C$_{18}$-alkenyl, saturated C$_5$-C$_7$-cycloalkyl, or C$_1$-C$_4$-alkyl substituted by a N-containing or O-containing heterocyclic ring, and, except in the case of alkenyl, the radical R$_3$ can carry one or more substituents.

In a further preferred embodiment of the invention, the mixture contains components (b) and (c) in such amounts that 0.2 to 3.0 hydroxyl equivalents of components (b) and (c) are present per mol of (a).

Suitable substituents of R$_3$, if the latter is C$_1$-C$_{12}$-alkyl, are, for example, acetoxy, C$_1$-C$_4$-alkoxy, such as methoxy, ethoxy or n-butoxy, cyclohexyl or phenyl, and amongst these especially ethoxy or phenyl. If R$_3$ is

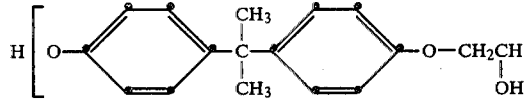

(VI)

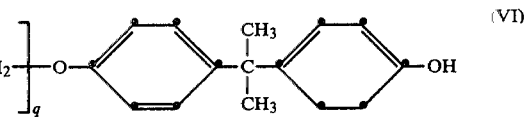

which can be obtained by a (so-called) advancement reaction of a diglycidyl ether of 2,2-bis-(p-hydroxyphenyl)propane with 2,2-bis-(p-hydroxyphenyl)-propane (known as bisphenol A). q is a number from 2 to 100.

F. A polyalkylene glycol, for example a polyethylene glycol, polypropylene glycol or polybutylene glycol having an average molecular weight of 150-6,000, preferably 150-4,000.

G. An oligo-ester containing hydroxyl end groups, the ester being formed by reacting a glycol or polyol, as described under A, C and D, and a dicarboxylic acid of C$_5$-C$_7$-cycloalkyl, a suitable substituent thereof is, for example, C$_1$-C$_4$-alkyl, such as methyl, isopropyl or tert.-butyl, but preferably methyl. If R$_3$ is C$_1$-C$_4$-alkyl substituted by a N-containing or O-containing heterocyclic ring, a suitable substituent of R$_3$ is, for example, C$_1$-C$_4$-alkyl, such as methyl or tert.-butyl, preferably methyl, the substituents in each case being on the heterocyclic ring.

If R$_3$ in formula III is C$_1$-C$_{12}$-alkyl, it can be, for example, methyl, ethyl, isopropyl, n-butyl, n-hexyl, 2-ethylhexyl or n-dodecyl.

If R$_3$ is substituted C$_1$-C$_{12}$ alkyl, preferred meanings are 2-methoxyethyl, 2-ethoxyethyl, 2-butoxyethyl, cyclohexylmethyl, benzyl and α-phenylethyl and especially 3-ethoxypropyl or benzyl.

If $R_3$ is $C_3-C_{18}$-alkenyl, it can be, for example, allyl, methallyl, 2-methyl-butenyl or 8-octadecenyl.

If $R_3$ is $C_5-C_7$-cycloalkyl, it can be, for example, cyclopentyl, cyclohexyl or cycloheptyl, amongst which cyclopentyl and cyclohexyl are preferred and cyclohexyl is especially preferred.

Substituted $C_5-C_7$-cycloalkyl is preferably 3-methoxycyclopentyl or, especially, 4-methylcyclohexyl.

If $R_3$ is $C_1-C_4$-alkyl substituted by a N-containing or O-containing heterocyclic ring, it can be, for example, furfuryl or piperidinoethyl.

If $R_3$ is a $C_1-C_4$-alkyl group which carries a N-containing or O-containing heterocyclic ring which can itself be substituted by $C_1-C_4$-alkyl, a particularly preferred meaning of $R_3$ is 3-(5',5'-dimethylhydantoin)-propyl.

Examples of compounds of the formula III are ethanol, isopropanol, allyl alcohol, cyclohexanol, furfuryl alcohol and benzyl alcohol.

Monohydroxy compounds of the formula III in which $R_3$ is $C_1-C_{12}$-alkyl are preferred.

The polyaddition reaction can be carried out at 0° to +300° C., preferably at +20° C. to +250° C.

The flexibility of the crosslinked moulding can be increased by adding component (c). Furthermore it can be desirable, for processing reasons, to lower the viscosity of the resin mixture to be processed, by adding component (c). For this purpose, component (c) can be employed in amounts of 0–30 mol % of the hydroxyl equivalents, preferably 1–15 mol %.

N-Cyanolactams react with di-hydroxy compounds or polyhydroxy compounds to form cyclic and linear trimerisation and oligomerisation products. The addition of the hydroxyl group to the N-cyanolactam takes place with the formation of ester groups, the highly reactive cyanamide group being set free transiently. The course of the reaction can be represented by the following scheme:

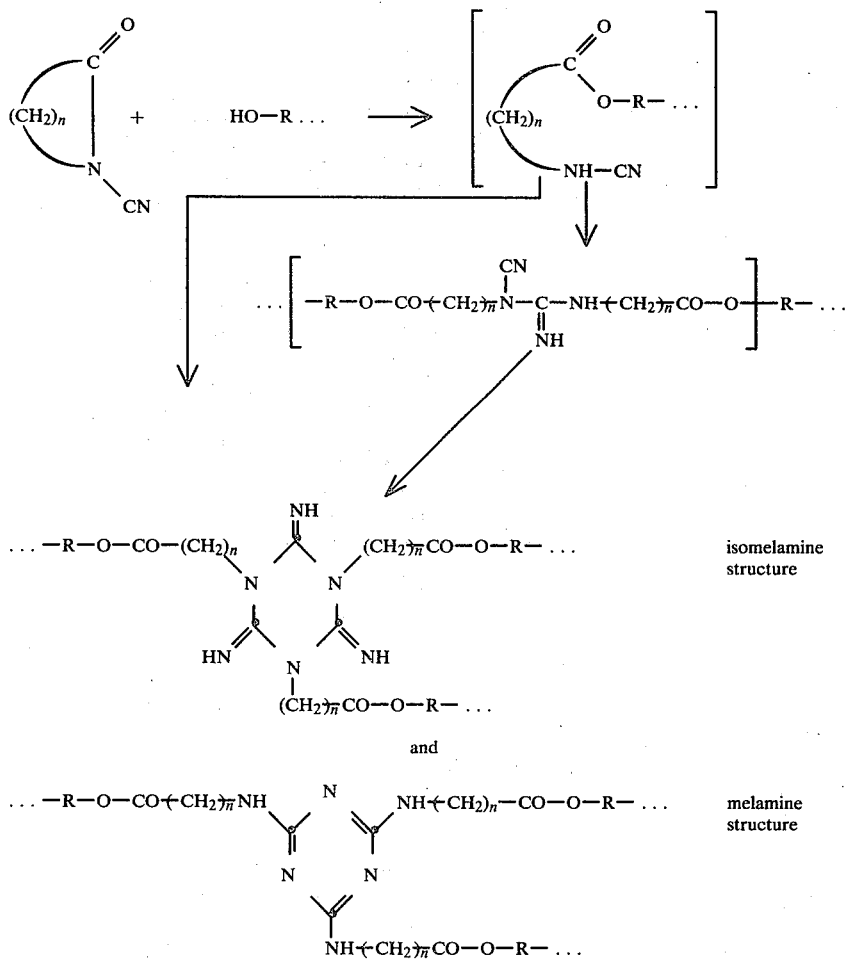

isomelamine structure melamine structure in which R is the organic radical, having not less than 2 C atoms and not less than 2 hydroxyl groups, of component (b).

Linear oligomerisation products as well as isomelamine structures and melamine structures are involved in the formation of the crosslinked polyadduct.

The polyaddition reaction can be carried out in the presence or absence of a catalyst. Examples of suitable catalysts are tertiary amines, such as triethylamine or benzyldimethylamine, pyridine and substituted pyridines, for example 4-dimethylaminopyridine, alkali metal alcoholates, for example sodium hexylate, imidazoles, for example 2-ethyl-4-methyl-imidazole, quaternary ammonium salts, for example tetramethylammonium chloride or benzyltrimethylammonium chloride, Lewis acids, for example tin-II chloride, lithium chloride or boron trifluoride etherate, and also N-p-chlorophenyl-N',N'-dimethylurea.

The catalysts can be employed in amounts of 0.1 to 5% by weight, preferably 0.1 to 2% by weight, based on the reaction mixture.

The starting compounds of the formula I and II can be prepared by the processes described in German Offenlegungsschrift 1,905,098 or German Offenlegungsschrift 1,175,678. They have a good shelf life even at an elevated temperature.

The hydroxy compounds constituting components (b) and (c) are commercially available or easily preparable by conventional methods.

The curable mixtures according to the invention can be used as casting resins, adhesives and foams. They can also be converted to coatings on such substrates as wood, glass, textiles, metal or earthenware, and can, before processing, be mixed with fillers, such as active charcoal, carbon black, wood flour, kieselguhr, pigments, glass fibres or metal powders.

The examples which follow illustrate the invention.

EXAMPLES

The resin systems are tested by torsional bond strength experiments. For this purpose, the N-cyanolactam and an equivalent amount of the hydroxy compound (1 equivalent of OH per mol of cyanolactam) are mixed, resulting, at room temperature or, where necessary, elevated temperature, in homogeneous mixtures which are more or less viscous. In some cases, small amounts of a catalyst are added to the mixtures.

To measure the torsional bond strength, 5 hollow cylinders (external diameter 12 mm) made of aluminium are bonded, by means of the resin mixture to be tested, onto a sturdy aluminium plate, the bonding surfaces of the cylinder and of the plate being cleaned and treated beforehand, by the pickling method (1 hour in chromosulphuric acid at 60° C.). The test specimens are then subjected to varying curing times and curing temperatures. After they have cooled to room temperature, a progressively increasing torque is exerted on the hollow cylinders by means of a wrench pipe. The torque applied to the bond is measured, via a lever arm, by a force transducer, and is recorded electrically. The shearing stress in the adhesive layer progressively increases up to fracture, the force required to cause fracture being registered in $N.mm^{-2}$.

EXAMPLE 1

N-Cyanopyrrolidone and 1,4-bis-(hydroxymethyl)-benzene are mixed in the molar ratio of 2:1 and the mixture is cured at various temperatures, without addition of a catalyst. The following torsional bond strengths are found:
After curing for 1 hour at 100° C.: 35.3 $N.mm^{-2}$
After curing for 1 hour at 140° C.: 44.5 $N.mm^{-2}$
After curing for 1 hour at 180° C.: 57.0 $N.mm^{-2}$
After curing for 5 hours at 140° C.: 39.7 $N.mm^{-2}$

EXAMPLE 2

N-Cyanopyrrolidone and 1,6-hexanediol are mixed in the molar ratio of 2:1 and the mixture is cured at various temperatures, with addition of 1% by weight of benzyl-dimethylamine as the catalyst. The following torsional bond strengths are found:
After curing for 1 hour at 180° C.: 34.5 $N.mm^{-2}$
After curing for 5 hours at 140° C.: 23.6 $N.mm^{-2}$

EXAMPLE 3

N-Cyanopiperidone and 1,4-bis-(hydroxymethyl)-benzene are mixed in the molar ratio of 2:1 and the mixture is cured at various temperatures, without addition of a catalyst. The following torsional bond strengths are found:
After curing for 1 hour at 100° C.: 27.8 $N.mm^{-2}$
After curing for 1 hour at 140° C.: 59.0 $N.mm^{-2}$
After curing for 1 hour at 180° C.: 58.1 $N.mm^{-2}$
After curing for 5 hours at 140° C.: 64.8 $N.mm^{-2}$

EXAMPLE 4

N-Cyanopiperidone and 1,6-hexanediol are mixed in the molar ratio of 2:1 and the mixture is cured at various temperatures, with addition of 1% by weight of benzyl-dimethylamine as the catalyst. The following torsional bond strengths are found:
After curing for 1 hour at 180° C.: 34.7 $N.mm^{-2}$
After curing for 5 hours at 140° C.: 15.5 $N.mm^{-2}$

EXAMPLE 5

N-Cyanocaprolactam and 1,4-bis-(hydroxymethyl)-benzene are mixed in the molar ratio of 2:1 and the mixture is cured at various temperatures, without addition of a catalyst. The following torsional bond strengths are found:
After curing for 1 hour at 100° C.: 11.4 $N.mm^{-2}$
After curing for 1 hour at 140° C.: 49.5 $N.mm^{-2}$
After curing for 1 hour at 180° C.: 50.5 $N.mm^{-2}$
After curing for 5 hours at 140° C.: 51.6 $N.mm^{-2}$

EXAMPLE 6

N-Cyanocaprolactam and 1,6-hexanediol are mixed in the molar ratio of 2:1 and the mixture is cured at various temperatures, with addition of 1% by weight of benzyldimethylamine as the catalyst. The following torsional bond strengths are found:
After curing for 1 hour at 140° C.: 20 $N.mm^{-2}$
After curing for 1 hour at 180° C.: 36 $N.mm^{-2}$
After curing for 5 hours at 140° C.: 28 $N.mm^{-2}$ Testing the polyadducts in the form of cast panels

EXAMPLE 7

To produce a cast panel of size 200×200×4 mm from N-cyanopyrrolidone and trimethylolpropane in the molar ratio of 3:1, 156.4 g (1.42 mols) of N-cyanopyrrolidone and 43.6 g (0.47 mol) of trimethylolpropane are mixed in a beaker and the mixture is heated to 60° C. until clear. 0.5 g (0.25% by weight, based on the total amount of the two reactants) of 4-dimethylaminopyridine are added, as the catalyst, to the clear solution.

The solution is then cooled to 30° C. and is degassed in a high vacuum, namely $1.333 \times 10^{-5}$ bar. The clear homogeneous mixture is then poured into a mould which has been pretreated with a commercial release agent based on silicone oil, and has been preheated to 60° C. Curing is effected in an oven for 2 hours at 60° C., 2 hours at 90° C. and, finally, 2 hours at 120° C.

Moulded panels having the following properties are obtained:

| | |
|---|---|
| Flexural strength (maximum) (VSM* 77,103) | 169.2 $N \cdot mm^{-2}$ |
| Flexural strength (at break) (VSM 77,103) | 151.1 $N \cdot mm^{-2}$ |
| Deflection (maximum) (VSM 77,103) | 7.41 mm |
| Deflection (at break) (VSM 77,103) | 10.43 mm |
| Impact strength (VSM 77,105) | 17.11 $kJ/m^2$ |
| Tensile strength (maximum) (DIN 53,455) | 99.8 $N \cdot mm^{-2}$ |

| | |
|---|---|
| Tensile strength (at break) (DIN 53,455) | 94.3 N · mm$^{-2}$ |
| Elongation (maximum) (DIN 53,455) | 10.76% |
| Elongation (at break) (DIN 53,455) | 13.50% |
| Specific volume resistivity (DIN 53,482) | 1.7 × 10$^{15}$ × cm |
| Tracking resistance (DIN 53,480) | level KA 3 d |

*VSM stands for Verein Schweizerischer Maschinenindustrieller

EXAMPLE 8

The procedure described in Example 7 is followed, except that 136.62 g (0.99 mol) of N-cyanocaprolactam and 63.48 g (0.46 mol) of 1,4-bis-(hydroxymethyl)-benzene, corresponding to a molar ratio of about 2:1, and 1 g (0.5% by weight based on the total amount of the two reactants) of 4-dimethylaminopyridine, as a catalyst, are reacted. The temperature required for the mixture to become clear is 120° C. The degassed reaction mixture is poured into a mould preheated to 130° C.

Curing is effected for 2 hours at 130° C. and 1 hour at 180° C.

Moulded panels having the following properties are obtained:

| | |
|---|---|
| Flexural strength (maximum) (VSM 77,103) | 99.47 N · mm$^{-2}$ |
| Flexural strength (at break) (VSM 77,103) | 52.88 N · mm$^{-2}$ |
| Deflection (maximum) (VSM 77,103) | 7.13 mm |
| Deflection (at break) (VSM 77,103) | 20.12 mm |
| Impact strength (VSM 77,105) | 51.80 kJ/m$^2$ |
| Tensile strength (maximum) (DIN 53,455) | 56.23 N · mm$^{-2}$ |
| Tensile strength (at break) (DIN 53,455) | 38.58 N · mm$^{-2}$ |
| Elongation (maximum) (DIN 53,455) | 6.01% |
| Elongation (at break) (DIN 53,455) | 23.53% |

EXAMPLE 9

The procedure described in Example 8 is followed, except that, in place of 1,4-bis-(hydroxymethyl)-benzene, trimethylolpropane is used.

The following mixtures are prepared:

| Mixture | Molar ratio | N—Cyano-caprolactum (g) | Trimethylol-propane (g) | Catalyst (g) |
|---|---|---|---|---|
| A | 3:1 | 145.40 | 44.70 | 0.95 |
| B | 1.7:1 | 130.86 | 71.20 | 1.01 |

Moulded panels having the following properties are obtained:

| Property | | A | B |
|---|---|---|---|
| Flexural strength (N · mm$^{-2}$) (VSM 77,103) | maximum | 106.34 | 84.99 |
| | at break | 67.34 | 40.72 |
| Deflection (mm) (VSM 77,103) | maximum | 8.28 | 7.27 |
| | at break | 19.53 | 20.48 |
| Impact strength (VSM 77,105) | kJ/m$^2$ | 30.68 | 73.45 |
| Tensile strength (N · mm$^{-2}$) (DIN 53,455) | maximum | 66.83 | 60.25 |
| | at break | 65.33 | 36.08 |
| Elongation (%) (DIN 53,455) | maximum | 6.55 | 3.98 |
| | at break | 10.58 | 41.03 |

EXAMPLE 10

The procedure described in Example 7 is followed, except that, in place of trimethylolpropane, 1,4-bis-(hydroxymethyl)-cyclohexane is used. The temperature required for the mixtures to become clear is 80° C.

The following mixtures are prepared:

| Mixture | Molar ratio | N—Cyano-pyrrolidone (g) | 1,4-Bis-(hydroxy-methyl)-cyclohexane (g) | Catalyst (g) |
|---|---|---|---|---|
| C | 1.8:1 | 121.12 | 88.13 | 1.58 |
| D | 2:1 | 115.61 | 75.71 | 1.43 |
| E | 2.5:1 | 132.13 | 69.22 | 1.51 |
| F | 3:1 | 143.14 | 62.49 | 1.54 |

The pretreated reaction mixture is poured into moulds which have been preheated to 80° C. Curing is effected for 4 hours at 100° C. and 1 hour at 180° C.

Moulded panels having the following properties are obtained:

| Property | | C | D | E | F |
|---|---|---|---|---|---|
| Flexural strength (N · mm$^{-2}$) (VSM 77,103) | maximum | 76.33 | | | |
| | at break | 39.71 | | | |
| Deflection (mm) (VSM 77,103) | maximum | 8.52 | | | |
| | at break | 20.83 | | | |
| Impact strength (kJ/m$^2$) (VSM 77,105) | | 42.24 | | | |
| Tensile strength (N · mm$^{-2}$) (DIN 53,455) | maximum | 46.59 | 79.77 | 78.50 | 82.90 |
| | at breaK | 30.09 | 44.04 | 56.47 | 62.35 |
| Elongation (%) (DIN 53,455) | maximum | 4.94 | 5.70 | 8.96 | 5.14 |
| | at break | 30.46 | 8.19 | 24.37 | 14.53 |

What is claimed is:

1. A mixture for the preparation of crosslinked nitrogen-containing polyadducts, which mixture contains
(a) a N-cyanolactam of the formula I or II

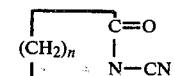
(I)

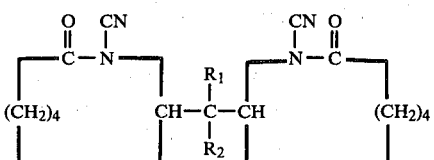
(II)

in which n is an integer from 2 to 11, the methylene carbon atoms are unsubstituted or substituted, in total, by one or two methyl or ethyl groups, and R$_1$ and R$_2$, independently of one another, are hydrogen or methyl, and
(b) a monomeric or oligomeric organic compound having not less than 2 C atoms and not less than 2 hydroxyl groups.

2. A mixture according to claim 1, which contains component (b) in an amount corresponding to 0.2–3.0 hydroxyl equivalents of component (b) per mol of (a).

3. A mixture according to claim 1, wherein up to 30 mol % of the hydroxyl equivalents of component (b) are replaced by (c) a monohydroxy compound of the formula III

R₃—OH    (III)

in which $R_3$ is straight-chain or branched $C_1$–$C_{12}$-alkyl or said alkyl substituted by acetoxy, by $C_1$–$C_4$ alkoxy, by cyclohexyl or by phenyl; straight-chain or branched $C_3$–$C_{18}$-alkenyl; $C_5$–$C_7$-cycloalkyl or said cycloalkyl substituted by $C_1$–$C_4$-alkyl; or $C_1$–$C_4$-alkyl substituted by a N-containing or O-containing heterocyclic ring where said ring is unsubstituted or substituted by $C_1$–$C_4$-alkyl.

4. A mixture according to claim 3, which contains components (b) and (c) in amounts corresponding to 0.2–3.0 hydroxyl equivalents of components (b) and (c) per mol of (a).

5. A mixture according to claim 1, which contains, as component (a), a compound of the formula I according to claim 1, in which n is 3 to 5.

6. A mixture according to claim 1, which contains, as component (a), a compound of the formula II according to claim 1, in which $R_1$ and $R_2$ are hydrogen.

7. A mixture according to claim 1, which contains, as component (b), (α) a diol of the formula

HO—Q—OH    (IV)

in which Q is a straight-chain or branched, saturated or unsaturated aliphatic radical having 2–12 C atoms, or said radical interrupted by O-bridges, or is a saturated or unsaturated divalent cycloaliphatic radical having 5–6 C atoms, or is the group

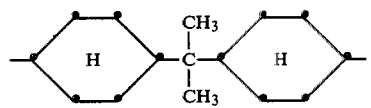

or is a derivative, substituted by halogen, $C_1$–$C_4$-alkoxy, phenoxy or $C_1$–$C_4$-alkylphenoxy, of one of the above radicals, or is the group

—(CH₂)ₙ′—Y₁—(CH₂)ₙ′— in which n' is a number from 1 to 4 and $Y_1$ is $C_5$–$C_6$-cycloalkylene, phenylene, the group

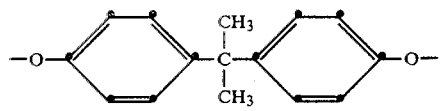

or a divalent N-heterocyclic structure, (β) a straight-chain or branched saturated aliphatic trihydroxy or tetrahydroxy compound or N-heterocyclic trihydroxy compound or (γ) an adduct which results from the addition reaction of 1 to 2 mols of a 1,2-epoxide compound with a dihydric or polyhydric hydroxy compound, as defined under (α) and (β); or an oligo-ester containing hydroxyl end groups, the ester being formed by reacting a hydroxyl compound, as described under (α) and (β), or the aforementioned adduct, with a dicarboxylic acid of the formula

HOOC—(Y₂)ₚ—COOH or with a lactone of the formula

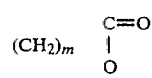

in which $Y_2$ is a straight-chain or branched alkylene radical having 2–12 C atoms, an unsubstituted or $C_1$–$C_4$-alkyl-substituted saturated or unsaturated $C_5$–$C_6$-cycloalkylene radical or an unsubstituted or $C_1$–$C_4$-alkyl-substituted phenylene radical, m is a number from 2 to 11, and p is 0 or 1.

8. A mixture according to claim 7, which contains, as component (b), a diol of the formula HO—Q—OH (IV), in which Q is a methylene chain having 2 to 6 C atoms or is the group —(CH₂)ₙ′Y₁—(CH₂)ₙ′, in which n' is a number from 1 to 4 and $Y_1$ is $C_5$–$C_6$-cycloalkylene, phenylene, the group

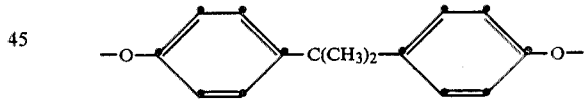

or a divalent N-heterocyclic structure.

9. A mixture according to claim 3, where $R_3$, in formula III, is $C_1$–$C_{12}$-alkyl which is substituted by acetoxy, $C_1$–$C_4$-alkoxy, cyclohexyl or phenyl, or is $C_5$–$C_7$-cycloalkyl which is substituted by $C_1$–$C_4$-alkyl, or is $C_1$–$C_4$-alkyl which is substituted by a N-containing or O-containing heterocyclic ring which is itself substituted by $C_1$–$C_4$-alkyl.

* * * * *